Nov. 6, 1945.   R. M. KRAUS   2,388,553
WHEEL HOE
Filed Aug. 12, 1942   3 Sheets-Sheet 1
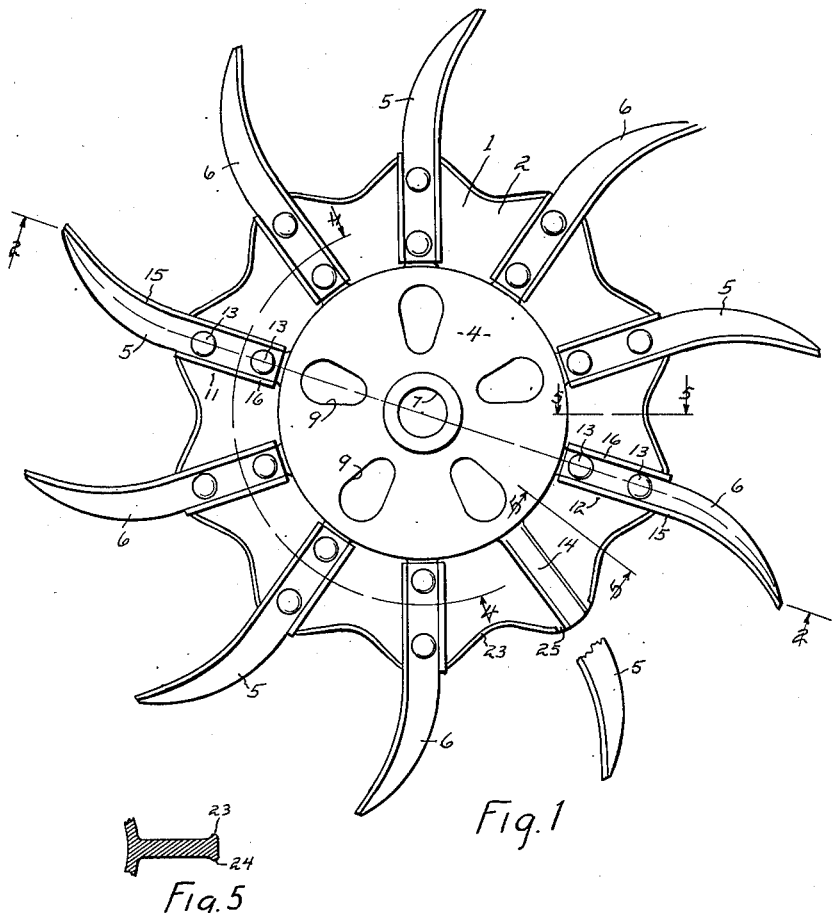
Fig.1
Fig.5
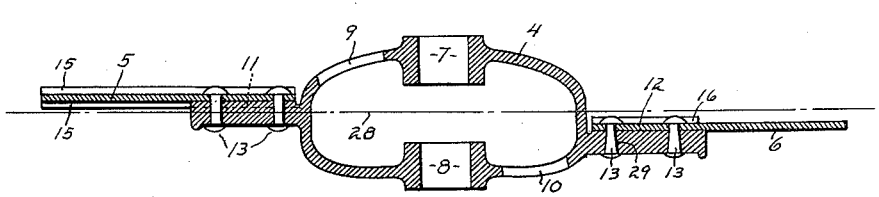
Fig.2
INVENTOR.
Raymond M Kraus
BY
Harry R. Canfield
ATTORNEY Nov. 6, 1945. R. M. KRAUS 2,388,553
WHEEL HOE
Filed Aug. 12, 1942 3 Sheets-Sheet 3
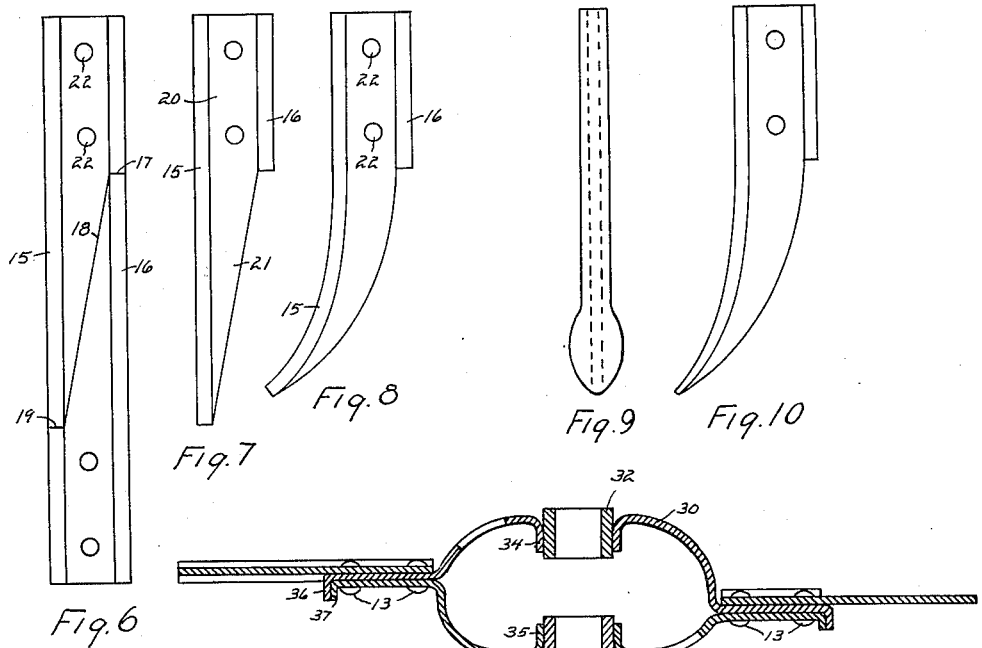
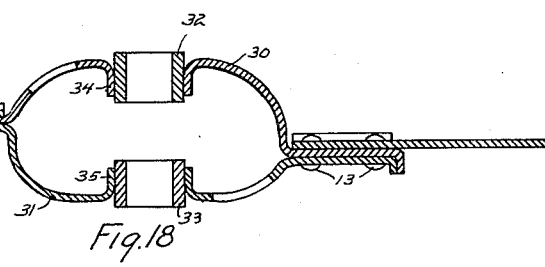
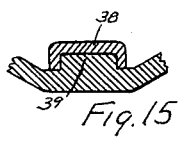
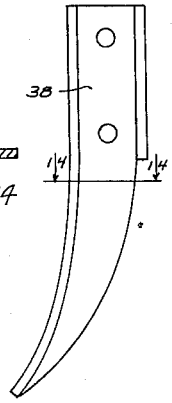
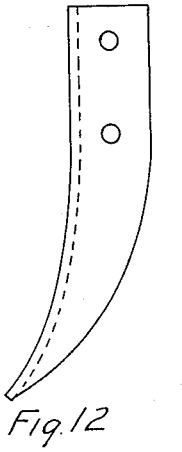
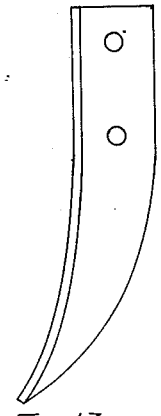
Inventor
Raymond M. Kraus
By Harry R. Canfield
Attorney Patented Nov. 6, 1945

2,388,553

UNITED STATES PATENT OFFICE 2,388,553

WHEEL HOE

Raymond M. Kraus, Cleveland, Ohio, assignor to The Dunham Company, Berea, Ohio, a corporation of Ohio Application August 12, 1942, Serial No. 454,513

12 Claims. (Cl. 97—212)

This invention relates to ground working agricultural tools of the rotary toothed wheel type, sometimes called wheel hoes.

Agricultural tools of the rotary toothed wheel type are known comprising generally a central disc or body rotatable on a shaft and having, peripherally thereof, teeth for working the soil. A number of such toothed wheels are sometimes mounted side by side on a shaft of an implement frame, rotatable independently of each other on the shaft, and the frame is propelled over the soil by power, for example by a tractor, and the toothed wheels support the frame while the teeth thereof work the soil.

It is the primary object of this invention:

To provide generally an improved construction of toothed wheel of this general type.

Other objects are:

To provide a toothed wheel of the class referred to the teeth of which are formed separately and attached to a central body in an improved manner;

To provide a toothed wheel of the class referred to in which alternate teeth around the wheel are staggered axially relatively to each other and in which the staggered relation is provided in an improved manner;

To provide a toothed wheel of the class referred to in which the attachment of separate teeth to a central body is effected in a manner to insure permanent rigidity at the attachment;

To provide a toothed wheel of the class referred to having an improved mode of operation;

To provide in a toothed wheel of the class referred to an improved construction of central body;

To provide for toothed wheels of the class referred to an improved construction of tooth.

Other objects will be apparent to those skilled in the art to which my invention appertains. My invention is fully disclosed in the following description taken in connection with the accompanying drawings in which:

Fig. 1 is a front side elevational view of a toothed wheel embodying my invention with a part of one of the teeth thereof broken away;

Fig. 2 is a transverse sectional view taken from the plane 2—2 of Fig. 1;

Fig. 5 is a fragmentary sectional view taken from the plane 5—5 of Fig. 1;

Figs. 6, 7, and 8 are views illustrating the preferred process of making the teeth of the wheel of Fig. 1;

Figs. 9 and 10 are views illustrating a modification of the tooth of Figs. 6 to 8;

Figs. 11, 12 and 13 are views illustrating other forms of teeth which I may employ;

Fig. 14 is a sectional view taken from the plane 14—14 of Fig. 11;

Figs. 15, 16, and 17 are transverse sectional views showing fragmentarily the means for anchoring the teeth of Figs. 11, 12 and 13 respectively, to the main body of the wheel;

Fig. 18 is a view similar to Fig. 2, but illustrating a modification.

Figure 3:
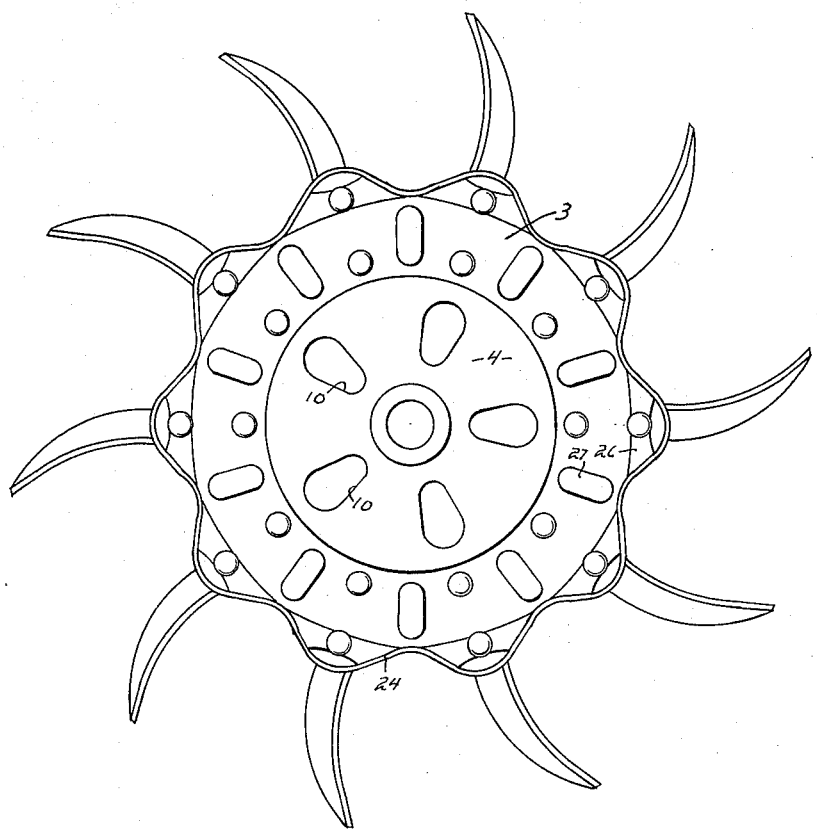
Fig. 3 is a back side elevational view of the toothed wheel of Fig. 1.

Referring to the drawings, I have shown at 1 a generally disc form wheel body having opposite side faces 2 and 3, Figs. 1 and 3, and at 4 a hollow walled hub, and these parts are preferably formed in one piece from cast metal although in some cases they may be fabricated from separate pieces secured together. A plurality of soil working teeth 5—5 and 6—6 are secured upon the face 2, Fig. 1.

The wheel as referred to is to be rotatably mounted on a shaft, and it is desired to give the wheel an axially long bearing support on the shaft, and to this end two bearing bores 7 and 8 are formed spaced apart axially and overhanging or axially spaced from the opposite faces 2 and 3 of the disc form wheel body as shown in Fig. 2.

In the operation of toothed wheels of this general class, they are rotated along the ground at considerable speed, and soil is lifted by the rotation of the wheel, and it has been found that some of it falls between adjacent wheels and works into the bearing bores. For this reason the hollow walled hub 4 of the wheel herein described is provided with a plurality of openings 9—9 and 10—10 therethrough. Soil or dirt which may work into the bearing bores may thus pass therethrough and out betwen them into the hollow hub and thrown out from the hollow hub at the openings 9—10 by centrifugal force due to the large diameter of the hub and the speed of rotation; and dirt which may fall upon the hub adjacent to the openings is prevented from entering them and finding its way to the bearing bores, by the action of centrifugal force.

Thus dirt is prevented from remaining in and accumulating in the bearing bores and causing undue wear and rapid deterioration, and an improvement is thus effected in the bearing, which is not present in a single bearing having a single bore supported by the disk as heretofore practiced.

The disc form wheel body 1, which for convenience may be referred to as the "disc," is in general in planes at right angles to the axis of the said bearings, but is not itself planar. Its front face 2 is provided with tooth supporting surfaces 11—11 and 12—12 underlying the teeth 5 and 6; and the surfaces 11—11 supporting the alternate teeth 5—5, are staggered with respect to the surfaces 12—12 supporting the teeth 6—6, that is to say, the surfaces 11—11 are disposed generally in a rotational plane spaced axially from a generally rotational plane in which the said surfaces 12—12 are disposed.

The alternating teeth 5 and 6 are secured upon these alternating tooth supporting surfaces and therefore the teeth themselves are in alternate staggered relation. This staggered relation of the said surfaces and teeth is best shown in Figs. 2 and 4.

The teeth 5 and 6 are all secured upon the same side face 2 of the disc by rivets or the like 13—13, projected through aligned perforations in the teeth and in the disc; two rivets at least being preferred for each tooth as shown.

The teeth are preferably made, as shown, from steel bar stock of I-section such as is customarily used in the agricultural art in the construction of various types of agricultural implement frames; and this sectional shape of the tooth material performs several functions as will presently appear.

Figure 4:
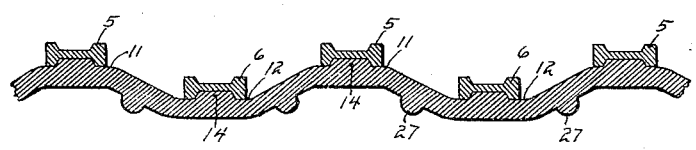
Fig. 4 is a fragmentary view to enlarged scale taken from the plane 4—4 of Fig. 1 with some of the parts behind the section plane omitted.

This steel section has in general the shape shown in Figs. 1 and 4; and the teeth are mounted flatwise upon the said disc supporting surfaces. There is thus a recess on the underside of the tooth extending longitudinally of the tooth. Each of the said tooth supporting surfaces is formed with a rib or projection 14 best shown in Figs. 1 and 4 but indicated in Fig. 2, which substantially fits the said recesses of the teeth.

The intermeshing of these projections and recesses positions the teeth so that they all extend in the same desired relative direction outwardly away from the axis and therefore the rivet holes do not have to align them accurately; and the rivets do not have to fit the holes accurately at the time the rivets are inserted; and when the rivets are riveted over and set, which as is well known causes them to expand and tightly fill the rivet holes, the teeth are accurately positioned and rigidly attached in spite of irregularities in the spacing and punching or drilling of the rivet holes, all of which contributes to cheaper production without sacrifice of accuracy. Furthermore such intermeshing of the teeth with the disc itself resists displacement of the teeth independently of the rivets, and thus is a reinforcement for the riveted connection. Without this reinforcement, if one of the rivets were to become loose or be torn out in use, the wheel would have to be immediately repaired, whereas with this reinforcement only one rivet would be enough to keep the tooth in working position until repairs could be more conveniently made.

Furthermore, these ribs or projections, extending generally radially greatly strengthen the body of the wheel to resist breaking.

The teeth of toothed wheel tools of this class perform their soil working functions more efficiently if, in their soil working portions, one edge of the tooth is thicker (axially) than the other, and if the tooth has a bent or curved form and a pointed end. The I-section tooth stock herein-before referred to adapts itself conveniently to these properties of the tooth as follows, with reference to the drawings Figs. 1, 2, and 6 to 8.

In fabricating the tooth, a straight length of blank of the stock is cut from a bar and with both flanges 15 and 16 thereon, as shown. The blank is then sheared off, into two like pieces, see Fig. 6, along a line 17—18—19, one of which pieces is shown in Fig. 7; and as seen therein it consists of an I-section body portion 20 and a tapering T-section tooth portion 21. The T-section portion is then bent to the form of Fig. 8 and is preferably bent so that the remaining flange 15 thereof is on the concave side as shown. The body is punched as at 22—22 to provide the rivet holes.

A strong tooth, having the advantageous soil working properties referred to, and adapted to be rigidly secured to the disc as described, is provided by this process of making it.

In some cases it is desirable, as further improving the soil working properties of the tooth, for it to be of spade-form at its point; and this is accomplished by mashing the tooth at its end and from the condition of Fig. 8 to that of Figs. 9 and 10.

The shape of the spade-form thus provided may be varied, but the one preferred is that shown in the drawings; and to contribute to the end of making a complete disclosure herein of this form, Figs. 9 and 10 (as well as Figs. 6, 7, and 8) have been drawn to one half life size scale in the original drawings.

The above mentioned staggered relation of the teeth, which is known to be desirable, is herein obtained with all of the teeth on the same side face of the disc, and with all of the teeth identical, that is to say, without "rights" and "lefts"; and this has the advantages that the teeth can be produced more cheaply, being all identical and without waste or scrap material as shown above; and that they can be assembled with the disc more cheaply because the placing of the teeth and the riveting of all of them can be done from one side of the disc, and all at one time if desired.

The staggered relation of the alternate tooth supporting surfaces 11—12 gives to the disc a generally corrugated form as plainly shown in Fig. 4; and this as is well known increases the strength of the material to resist transverse bending or breaking, whereby the disc may be made thinner and be more economical to manufacture without sacrifice of strength and rigidity. To still further add to the strength of the disc as a whole for further economy of material, its peripheral edge is thickened by forming thereon beads 23 and 24 on the respective faces 2 and 3. The bead 24 may be continuous, as shown, and the bead 23 may as shown in Fig. 1 at 25 be interrupted to leave spaces for the teeth.

This thickened peripheral edge also acts as a depth regulator to control the maximum depth to which the teeth may penetrate in soft soil.

As shown in Fig. 3 the zone of the disc where the outer rivets pass through it may be strengthened without unduly increasing the amount of material of the disc, by ribs 26, and the main body of the disc may be strengthened by radial ribs as shown at 27, Figs. 3 and 4.

In order that the wheel will rotate freely with the minimum of propulsion load (which is greatly multiplied when gangs of the wheels are assembled in an implement); and in order also that wear in the bearing bores will be equalized to prolong the life of the wheel, the two sets of teeth, 5 and 6, are staggered an equal amount on opposite sides of a central plane midway between the centers of the bearing bores, as shown for the plane 28 in Fig. 2.

The external surface of the hub is, as shown, of large diameter and smoothly rounded convexly on large radii, and this prevents the hub from catching on and picking up vines, grass, weed stocks, etc. and winding them around the rotating hub and accumulating thereon and generally fouling the wheel, as is liable to occur in prior wheels of this class.

The disc of the wheel as described above is particularly adaptable to be made as a metal casting; and the rivets which secure the teeth thereon may be rigidly set more economically, and more readily fix the teeth accurately in their predetermined positions if the rivet holes in the disc are cast therein with taper as shown for example at 29 in Fig. 2. A blow or pressure, on the rivet will then expand the rivet to fill the tapered hole, and make a rigid juncture without the necessity of actually heading over the end of the rivet as carefully as would be necessary without the taper.

It has been proposed to mount wheels of this class, on the implement so as to rotate in one direction, for plowing, cultivating, turning and pulverizing the soil; and to reverse them to rotate in the other direction to cut trash, weeds, etc. and generally tread the soil. The wheel above described is advantageous for both purposes. Very strong teeth, rigidly attached as described are necessary particularly when rotating in the reverse direction (which is counter-clockwise as viewed in Fig. 1) because then the teeth are working upon and supporting load upon their convexity and therefore are subjected to the maximum tendency to bend. The teeth above described are in their working portions of T-section and therefore of great strength; the web of the T is relatively thin and (when revolving in the reverse direction here referred to) performs a chopping and cutting action on vines, weeds, stocks, etc.; and the flange of the T performs the desirable "treading in" action and prevents excessive penetration.

The teeth shown and described above have their main body attachment portion shown as extending radially from the center, but this is not essential. They may lie in other directions on the disc; and while the several teeth as viewed in Fig. 2 are parallel to each other, this also is not essential; nor is the exact configuration of the soil working portion of the teeth outwardly beyond the disc shown in the drawing essential.

In the foregoing, a disc is described embodying my invention, which can most readily be made as a casting. However, as shown in Fig. 18, if preferred, the disc may be made from sheet metal. A brief description of this sheet metal form will, it is thought, suffice. The cross sectional shape is substantially the same as that of Fig. 2.

In Fig. 18 two sheet metal stampings 30 and 31 are provided, joined together by the rivets 13 which attach the teeth to the face of the stamping 30. Axially aligned bushings 32 and 33 are press fitted into nipples 34 and 35 formed on the stampings, to function as bearings. Each stamping has a half portion of the hub formed thereon as shown.

The wheel body or disc thus made is strengthened by peripheral flanges 36 and 37.

While the full advantages of my invention are best developed with teeth made from I-section stock as shown and described, many of its advantages described above may be enjoyed with teeth of other cross sectional forms.

In Figs. 11 and 15 is shown a tooth made from U-section stock, the main body 38 being of channel or U-section and interlocked with the metal of the disc as shown at 39 Fig. 15; and the point of the tooth being of L-section as shown in Figs. 11 and 14.

In Figs. 12 and 13 teeth are shown made of L-section stock; the body of the tooth being interlocked with the metal of the disc as shown respectively in Figs. 16 and 17.

It will be apparent that my invention is not limited to the exact details of construction illustrated and described. Changes and modifications may be made within the spirit of my invention without sacrificing its advantages; and my invention comprehends all such which come within the scope of the appended claims.

I claim:

1. In an agricultural tool of the rotary toothed wheel type, a one piece body of cast metal comprising a disc-like portion and a central hollow walled hub portion, axially aligned spaced-apart bearings on the hub portion, the walled hub portion having wall openings, between the bearings, the disc-like portion having opposite faces and one face being provided with a circular series of tooth-supporting surfaces at different elevations alternately around the series, a plurality of teeth all secured upon said one face and upon the said tooth-supporting surfaces and extending outwardly in directions away from the axis and alternately staggered by said disposition of the tooth-supporting surfaces, the teeth having body portions of I-section and ground-working portions of T-section, and means to rigidly secure the teeth body portions to the disc-like portion comprising ribs on the tooth-supporting surfaces meshed with the longitudinal recesses in the teeth provided by the I-section thereof, and rivets or the like projected through aligned perforations in the teeth and in the disc-like portion.

2. In an agricultural soil-working tool of the rotary, toothed-wheel type, a generally disc-form body having a plurality of soil-working teeth extending outwardly therefrom and secured thereto; and the body having a hollow-walled central bearing hub; axially-aligned spaced-apart bearing bores in the hub wall communicating with the hollow hub interior; the interior of the hollow hub, in rotational planes of the wheel, being of sufficiently great radial dimensions to cause soil which is lifted by the teeth and falls on the hub and works through the bearing bores into the hollow hub interior, to be propelled to the radially outer interior portions of the hollow hub by the centrifugal force developed thereon by the rotational velocity of the wheel while working the soil; and perforations in the hub wall adjacent to the said radially outer interior portions of the hub, through which the soil within the hollow hub is expelled outwardly therefrom by said centrifugal force.

3. In an agricultural soil working tool of the rotary, toothed-wheel type, a generally disc-form body having soil-working teeth extending outwardly therefrom, and having at its center a hollow walled hub, generally circular on its exterior in rotational planes of the wheel, and supporting axially-aligned spaced-apart bearing bores communicating with the hub interior; the inner periphery of the hollow circular hub being of sufficiently great radius to cause soil, which works through the bearing bores and into the hub interior, to be propelled radially outwardly to the inner periphery of the hub interior by the centrifugal force developed thereon by the soil-working rotational velocity of the wheel; and perforations in the hub wall adjacent the periphery of the hub interior through which soil in the hub interior is expelled from the hub by said centrifugal force.

4. In an agricultural soil-working tool of the rotary, toothed-wheel type, a disc-like body having a central bearing hub; the disc-like body having opposite faces, and one face being provided with a circular series of tooth-supporting surfaces at different elevations alternately around the series; a plurality of teeth all secured upon the said tooth-supporting surfaces of said one face and extending outwardly in directions away from the hub, and alternately staggered by said alternate elevations of the tooth-supporting surfaces; each tooth having an elongated body portion of I-section, throughout the length thereof and a soil-working portion of T-section; and means to rigidly secure the tooth body portion to the disc-like body comprising a rib for the tooth on the said tooth-supporting surfaces meshed with the longitudinal channel in one side only of the tooth body, provided by the I-section thereof; and rivets or the like projected through aligned perforations in the tooth and in the disc-like body to hold the tooth against the supporting surface and to maintain meshing engagement of the rib and channel; the cross sectional form of the I-section being that of a rolled steel bar of standard section from which the teeth are fabricated.

5. In an agricultural tool of the rotary toothed-wheel type, a disc-like body having a central hub; a bearing on the hub; the disc-like body having opposite faces, and one face being provided with a circular series of tooth-supporting surfaces, at different elevations alternately around the series; a plurality of teeth all secured upon the said tooth-supporting surfaces of said one face, and extending outwardly in directions away from the hub, and alternately staggered by said alternate elevations of the tooth-supporting surfaces; the teeth each comprising an elongated body portion and a soil-working portion; the soil working portion comprising a longitudinal flange and a longitudinal web, and the flange continuing integrally over the body portion of the tooth; and means to rigidly secure the tooth body portion to the said surface comprising portions of the said tooth-supporting surface formed to mesh with the longitudinally extending flange of the tooth body portion on one side only of the latter; and rivets or the like projected through aligned perforations in the tooth body portion and in the disc-like body, to hold the tooth body against the supporting surface and to maintain the said meshing engagement of the surface and the tooth body portion.

6. In an agricultural soil-working tool of the rotary, toothed-wheel type, a disc-like body having a central bearing hub; the disc-like body having tooth-supporting surfaces; a plurality of teeth secured upon the said tooth-supporting surfaces and extending outwardly in directions away from the hub, each tooth having an elongated body portion of I-section throughout its length, and soil-working portions of T-section; and means to rigidly secure the tooth body portion to the disc-like body comprising a rib for the tooth on the said tooth-supporting surface meshed with the longitudinal channel in one side only of the tooth provided by the I-section thereof; and rivets or the like projected through aligned perforations in the tooth and in the disc-like body, to hold the tooth against the supporting surface and to maintain meshing engagement of the rib and channel; the cross sectional form of the I-section being that of a rolled steel bar of standard section from which the teeth are fabricated.

7. In an agricultural tool of the rotary toothed-wheel type, a generally disc-form body having outwardly extending teeth thereon; all of the teeth being on the same side of the disc body; each tooth having an elongated body portion secured to the disc body and having a soil-working portion extending outwardly from the disc body; and the soil-working portion being concavo-convex with the convex side disposed in the forward direction of travel of the wheel when the tooth is in the rotational position to engage the soil; the soil-working portion having a soil-lifting flange on its rearward concave side, and a soil cutting web on its forward convex side, the cross sectional form of the body portion of the tooth being that of a rolled steel bar of standard flange-and-web section from which the tooth is fabricated; the flange of the soil-working portion continuing integrally over the body portion of the tooth, and meshing on one side only of the tooth body with a corresponding portion of the disc-form body, and a rivet or the like to hold the tooth body against the said side of the disc body and to maintain said meshing engagement.

8. A tooth for a soil-working tool of the rotary toothed-wheel type, comprising an elongated body portion for attachment to the wheel, and a soil-working portion extending integrally from the body portion and generally at an angle thereto, and of concavo-convex form; the cross sectional form of the tooth being determined by that of a rolled steel bar of standard flange-and-web section from which the tooth is fabricated, and comprising a flange of the rolled-section extending integrally and of uniform sectional area over the entire length of the body portion, and over at least a part of the soil working portion.

9. A tooth for a soil-working tool of the rotary toothed-wheel type, comprising an elongated body portion for attachment to the wheel, and a soil-working portion extending integrally from the body portion, and the body portion being of I-section and the soil-working portion of T-section, the form of the I-section being that of a rolled steel bar of standard section from which the tooth is fabricated, the flanges and web of the I-section extending over the whole length of the body portion.

10. A tooth for a soil-working tool of the rotary toothed-wheel type, comprising an elongated body portion for attachment to the wheel, and a soil-working portion extending integrally from the body portion and generally at an angle thereto and of concavo-convex form; the body portion being of I-section and the soil-working portion of T-section, with the flange of the T on the concave side of the soil-working portion, and the web of the T on the convex side thereof, the form of the I-section being that of a rolled steel bar of standard section from which the tooth is fabricated, the flanges and web of the I-section extending over the whole length of the body portion.

11. In an agricultural tool of the rotary toothed wheel type, a one piece disc like body of cast metal having a plurality of soil-working teeth secured thereto and projecting outwardly therefrom in different directions around the body and the body having at its central portion, a hollow walled hub integral with the body; and the hub having integral therewith axially oppositely extending axially spaced apart, tubular bearings for rotatively supporting the wheel on an axle and which bearings open into the hollow hub interior; the hub being externally smooth, and on planes coincident with the bearing axis being of outwardly convex rounded contour, and on planes at right angles to the axis being substantially circular, to cause the hub to rotate freely without entanglement with vines, weeds, etc. in use; and the wall of the hollow hub having openings therethrough communicating with its interior and radially spaced from the tubular bearings to permit egress of soil from the hub interior which may work thereinto through the bearings.

12. In an agricultural tool of the rotary toothed wheel type, a disc like body having a plurality of soil-working teeth secured thereto and projecting outwardly therefrom in different directions around the body; and the body having at its central portion a hollow walled hub integral with the body; and the hub having integral therewith axially oppositely extending, axially spaced apart, tubular bearings for rotatively supporting the wheel on an axle and which bearings open into the hollow hub interior; the hub being externally smooth, and on planes coincident with the bearing axis being of outwardly convex, rounded contour, and on planes at right angles to the axis being substantially circular, to cause the hub to rotate freely without entanglement with vines, weeds, etc. in use; and the wall of the hollow hub having openings therethrough communicating with its interior and radially spaced from the tubular bearings to permit egress of soil from the hub interior which may work thereinto through the bearings.

RAYMOND M. KRAUS.